(12) United States Patent
Maggeni et al.

(10) Patent No.: US 9,909,332 B2
(45) Date of Patent: *Mar. 6, 2018

(54) POOL CLEANER WITH A PROTRACTED FILTER

(71) Applicant: MAYTRONICS LTD., Kibutz Yizrael (IL)

(72) Inventors: Yohanan Maggeni, Ilaniya (IL); Oded Golan, Kefar Tavor (IL)

(73) Assignee: MAYTRONICS LTD., Kibbutz Yizrael (IL)

( * ) Notice: Subject to any disclaimer, the term of this patent is extended or adjusted under 35 U.S.C. 154(b) by 497 days.

This patent is subject to a terminal disclaimer.

(21) Appl. No.: 14/578,512

(22) Filed: Dec. 22, 2014

(65) Prior Publication Data
US 2015/0191925 A1    Jul. 9, 2015

Related U.S. Application Data

(60) Provisional application No. 61/924,267, filed on Jan. 7, 2014.

(51) Int. Cl.
| *B01D 33/00* | (2006.01) |
| *E04H 4/16* | (2006.01) |
| *C02F 1/00* | (2006.01) |
| *C02F 103/42* | (2006.01) |

(52) U.S. Cl.
CPC ........... *E04H 4/1654* (2013.01); *C02F 1/001* (2013.01); *C02F 2103/42* (2013.01)

(58) Field of Classification Search
CPC ...... B01D 29/09; B01D 29/096; B01D 33/04; B01D 29/216; B01D 29/96; B01D 33/801; E04H 4/1263; E04H 4/1654; C02F 1/001
USPC ................ 210/387, 385, 236, 297, 386, 400
See application file for complete search history.

(56) References Cited

U.S. PATENT DOCUMENTS

| 3,528,555 | A | * | 9/1970 | Zievers et al. | ......... B01D 29/09 |
| | | | | | 210/387 |
| 4,111,801 | A | * | 9/1978 | Jay | ..................... B01D 17/0202 |
| | | | | | 210/160 |
| 4,861,495 | A | * | 8/1989 | Pietzsch | ............... B01D 33/042 |
| | | | | | 100/118 |
| 5,961,822 | A | * | 10/1999 | Polimeni, Jr. | ......... E04H 4/1263 |
| | | | | | 210/122 |

* cited by examiner

*Primary Examiner* — Claire A Norris
(74) *Attorney, Agent, or Firm* — Reches Patents

(57) ABSTRACT

A pool cleaning robot that may include a fluid inlet, a filter; a winding mechanism and a holding mechanism; wherein the holding mechanism is configured to hold the filter; wherein the winding mechanism is configured to perform a winding of the filter thereby removing a filter portion that was positioned in a filtering position and placing another filter portion in the filtering position; and wherein the filter portion, when positioned in the filtering position, is configured to filter fluid that enters through the fluid inlet.

39 Claims, 16 Drawing Sheets

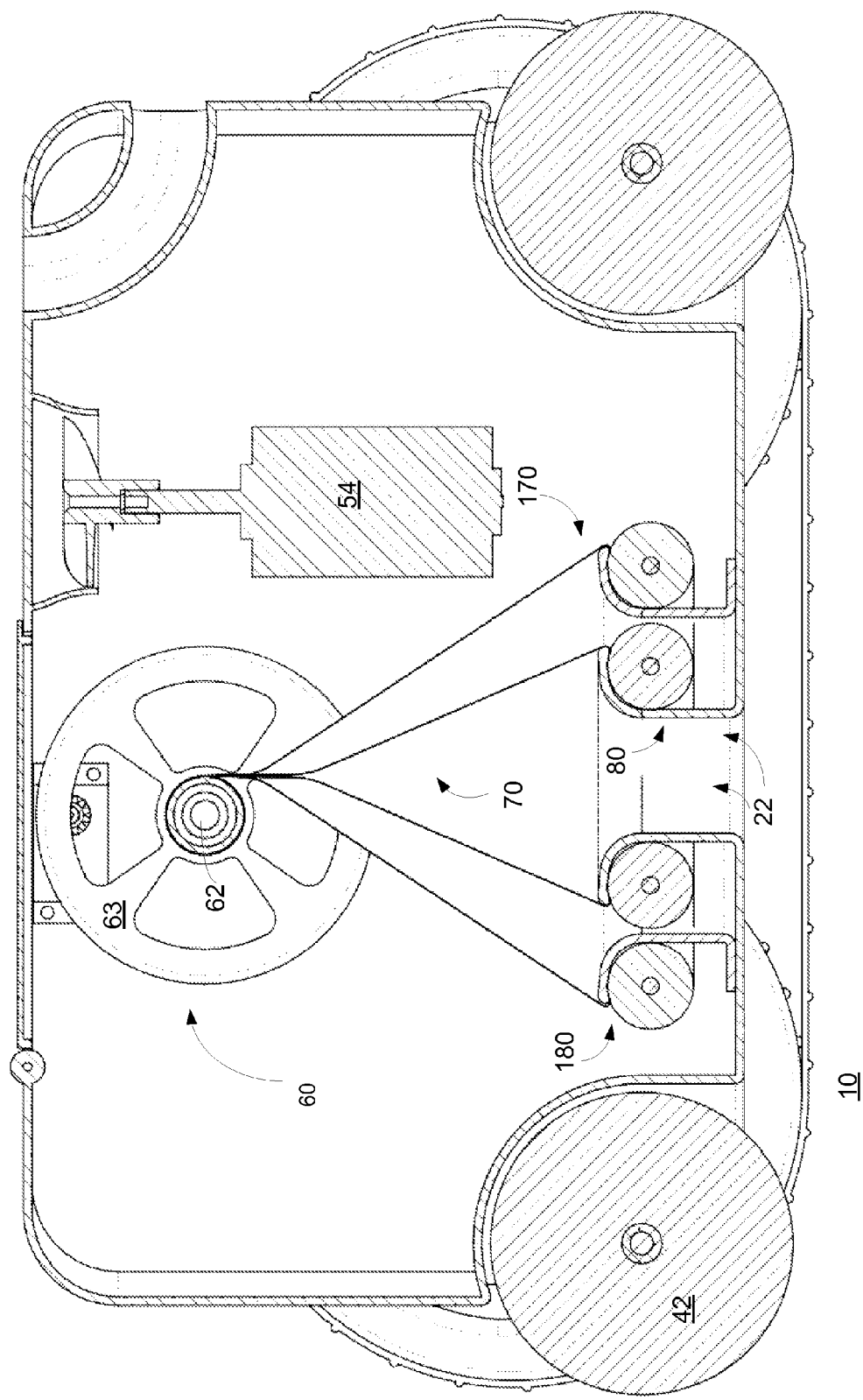

POOL CLEANER WITH A PROTRACTED FILTER

RELATED APPLICATIONS

This application claims priority from U.S. provisional patent Ser. No. 61/924,267 filing date Jan. 7, 2014 that is incorporated herein by reference.

BACKGROUND

Pool cleaning robots are configured to collect and filter waste or dirt. Prior art pool cleaning robots require frequent filter maintenance operations that involve taking the robot out of the pool. This task is time consuming and may also be difficult due to frequent necessity to perform such maintenance. The trend is to provide easy-to-use solutions that also extend the mean time between maintenances.

SUMMARY

A pool cleaning robot that may include a fluid inlet, a filter; a winding mechanism and a holding mechanism; wherein the holding mechanism may be configured to hold the filter; wherein the winding mechanism may be configured to perform a winding of the filter thereby removing a filter portion that was positioned in a filtering position and placing another filter portion in the filtering position; wherein the filter portion, when positioned in the filtering position, may be configured to filter fluid that enters through the fluid inlet.

The winding mechanism may be configured to perform the winding of the filter or by performing multiple winding iterations; wherein each winding iteration results in a removal of one current filter portion from the filtering position and a placement of another filter portion in the filtering position.

Each winding iteration may include a continuous winding of the filter.

Each winding iteration may include a non-continuous winding of the filter.

The winding of the filter extracts the other filter portion from the holding mechanism.

The filter may include multiple filter portions; wherein at least two of the multiple filter portions differ from each other by at least one filtering parameter.

The other filter portion, when positioned in the filtering position, has an opening that faces the fluid inlet and has a closed end that faces the winding mechanism.

At least a portion of the winding mechanism may be detachably coupled to a housing of the pool cleaning robot.

The pool cleaning robot may include a controller; wherein the controller may be configured to trigger the winding of the filter.

The pool cleaning robot may include a sensor that may be configured to provide at least one of a filter replacement indication and a filter portion replacement indication.

The sensor may be a fluid attribute sensor.

The sensor may be a filter shape sensor.

The sensor may be a wound filter sensor that may be configured to sense attributes of filter portions that are wound by the winding mechanism.

The sensor may be a load sensor that may be configured to sense a tension of the filter.

The sensor may be a winding monitor that may be configured to estimate a progress of the winding of the filter.

The winding mechanism may include a winding motor that may be dedicated for winding the filter.

The winding mechanism meshes with a transmission mechanism that mechanically couples an axle on which the filter may be wound to a motor selected out of a pump motor and a drive motor.

The winding mechanism may be configured to compress debris trapped within the filter by performing the winding of the filter.

The holding mechanism may be configured to store a filter, multiple filter portions and/or multi ply filter portions before any of the multiple filter portions are positioned in the filtering position, in a compressed form.

The holding mechanism surrounds a fluid path that starts at the fluid inlet.

The holding mechanism may be detachably coupled to the housing.

The filter or filter portions may be made of an elastic fabric.

The filter or filter portions may be made of a non-elastic fabric.

A pool cleaning robot that may include a fluid inlet, a filter; a winding mechanism and a holding mechanism; wherein the filter may include multiple filter portions; wherein the filter may be coupled to the winding mechanism and to the holding mechanism; wherein the winding mechanism may be configured to perform multiple winding iterations of the filter; wherein during each winding iteration a first filter portion may be moved from a holding position to a filtering position and a second filter portion may be moved from the filtering position to a wound position; wherein when positioned in the holding position the first filter portion contacts the holding mechanism; wherein during a filtering period that occurs when the second filter may be positioned in the filtering position the second filter may be configured to filter fluid that enters through a fluid inlet of the pool cleaning robot. Wherein when positioned in the wound position the second filter portion contacts the winding mechanism.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 16 illustrates a portion of a pool cleaning robot according to an embodiment of the invention.

DETAILED DESCRIPTION OF THE DRAWINGS

Figure 1:
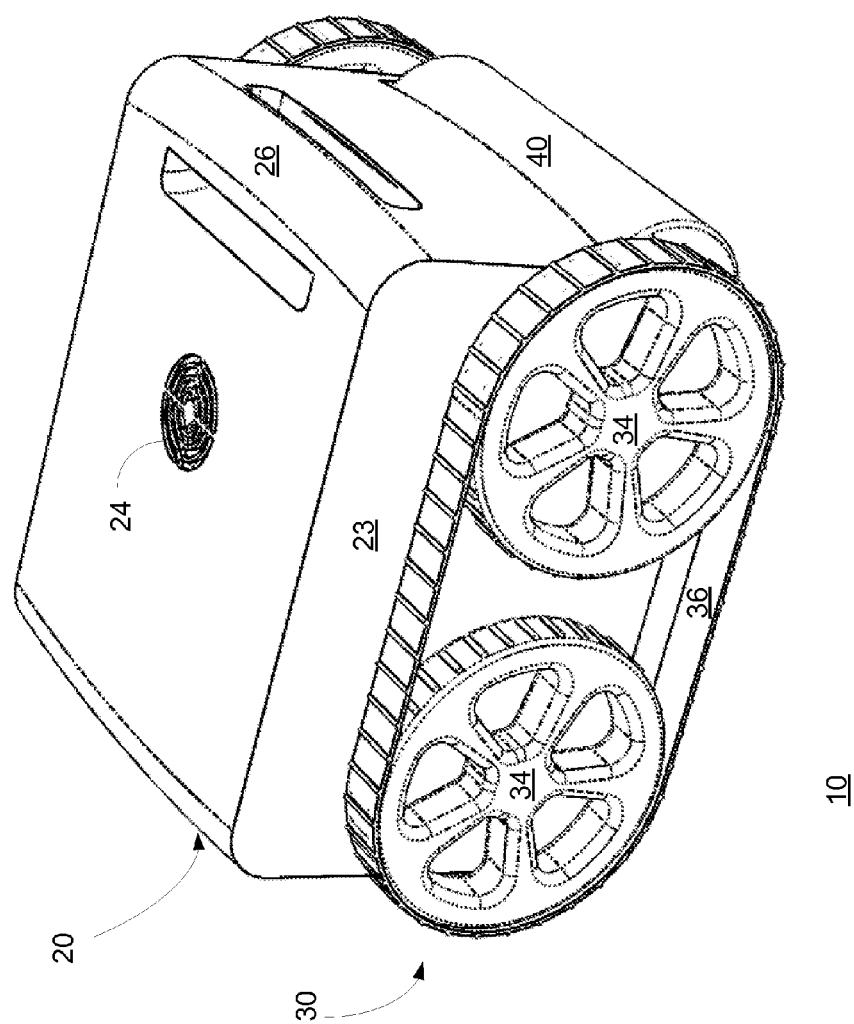
FIG. 1 illustrates a pool cleaning robot according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the current application any reference to the terms "including", or "comprising" may also be regarded as a reference to "consisting" or to "consisting essentially of".

The following reference numbers are used in the following description:
10 pool cleaning robot
20 housing
21 bottom of housing
22 fluid inlet
23 housing sidewall
24 fluid outlet
26 handle
27 curved lower portion of housing
30 driving module
34 wheels
36 track
40 brushwheel
42 brushwheel
50 fluid control module
52 impeller
54 pump motor
60 winding mechanism
61 winding motor
62 filter axle
63 first winding wheel
64 second winding wheel
65 detachable interface
70 filter
70(1), 70(2), 70(n−1), 70(n), 70(n+1), 70(N) filter portions
80 holding mechanism
80(1) inner part of holding mechanism
80(2) outer part of holding mechanism
80(3) opening
80(4) fastener
99 controller
101 Non-return valve
111, 112 and 113 parts of an intermediate fluid path.
162 additional filter axle
163 additional first winding wheel
170 additional filter
180 additional holding mechanism
122 additional fluid inlet The terms rolling and winding are used in an interchangeable manner in this application.

There may be provided a pool cleaning robot (denoted 10 in FIGS. 1-7) that may include a driving module (denoted 30 in FIG. 1) for moving the pool cleaning robot, a housing (denoted 20 in FIGS. 1-7), fluid control module (denoted 50 in FIG. 3) for controlling the flow of fluid through the pool cleaning robot, a cleaning module for cleaning the pool in which the pool cleaning robot moves and may have one or more additional modules known in the art. The following figures illustrate non-limiting examples of such modules. For example, the pool cleaning robot is illustrated as having a cleaning module that includes two brushwheels (denoted 40 and 42 in FIGS. 3, 4, 6 and 7), having a driving module that includes two pairs of tracks moved by two pairs of wheels (denoted 34 and 36 respectively in FIGS. 1 and 2), having a housing 20 of a certain shape and having a single fluid inlet 22 and a single fluid outlet 24 and as having a fluid control module that includes a pump motor and an impeller (denoted 50 and 52 in FIGS. 2, 3, 4, 6 and 7). These modules may differ from the modules illustrated in the figures. For example, the number of fluid inlets and outlets may differ from one, the driving module may exclude any track, the cleaning module may have one or more than two brushwheels, the housing may not include a handle, the pool cleaning robot may be hydraulic suction or pressure driven or electrical power driven, and the like.

FIG. 1 illustrates the pool cleaning robot 10 according to an embodiment of the invention. FIG. 1 illustrates only some of the elements of the pool cleaning robot such as housing 20, driving module 30 that includes wheels 34 and tracks 36, and brushwheel 40. The housing 20 has a fluid outlet 24 located at the top of the housing, handle 26 and a sidewall 23. The pool cleaning robot may also include any known components that are not directly related to the filtering operation.

FIGS. 2-7 illustrates pools cleaning robot according to various embodiments of the invention.

Figure 2:
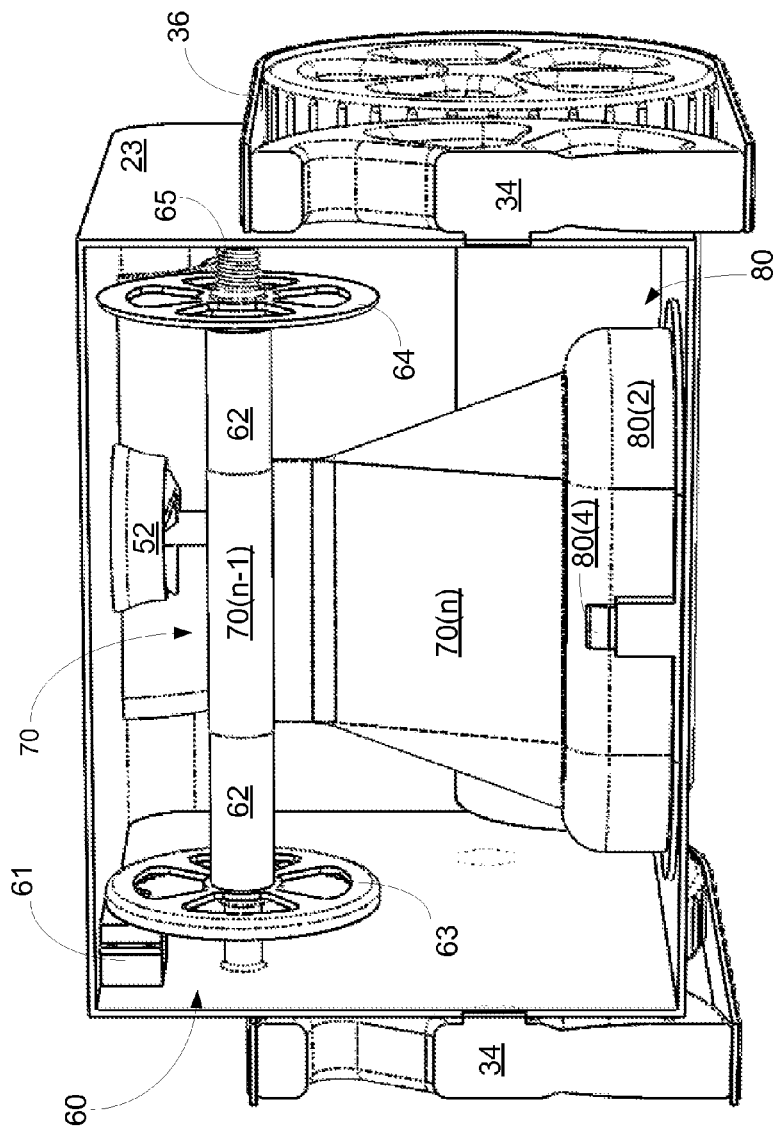
FIG. 2 is a cross sectional view of a pool cleaning robot taken along a traverse axis of the pool cleaning robot according to an embodiment of the invention.

The pool cleaning robots 10 include a fluid inlet (denoted 22 in FIGS. 3, 4, 6 and 7), a filter (denoted 70 in FIGS. 2 and 3), a winding mechanism (denoted 60 in FIG. 2) and a holding mechanism (denoted 80 in FIG. 2). The winding mechanism is any combination of mechanical elements that are configured to fetch and/or compress one or more filter portions. According to an embodiment of the invention the winding mechanism may apply any fetching and compression process including processes that do not include winding.

The holding mechanism (denoted 80 in FIG. 2) may include two sections and may be configured to hold the filter 70 in place and in a manner that enables retracting or pulling out the filter 70(n+1) through a slit opening that may run longitudinally along the contour of the holding mechanism. Especially, the holding mechanism holds filter portions that were not yet positioned in a filtering positon in a compressed or non-compressed form. The holding mechanism is any combination of mechanical elements that are configured to hold one or more filter portions.

Assuming that the filter has N filter portions and that at a given point of time (illustrated in FIG. 2) the n'th filter portion is positioned in a filtering position then the holding mechanism may hold the (n+1)'th till N'th filter portions and that the first till (n−1)'th filter portions are wound around a filter axle 62 of the winding mechanism 60. In FIG. 2 this is illustrated by reference number 70(n−1) that is the last filter portion that was wound by the winding mechanism. In FIGS. 2, 3, 4, 5, 6 and 7 the n'th filter portion 70(n) is positioned in a filtering position. In FIGS. 3, 4, 6 and 7 only the (n+1)'th filter portion 70(n+1) is illustrated as being held by the holding mechanism. The holding mechanism also holds the (n+2)'th till N'th filter portions—thereby holding (As illustrated in FIG. 14 filter portions 70(n+1)-70(N).

Figure 4:
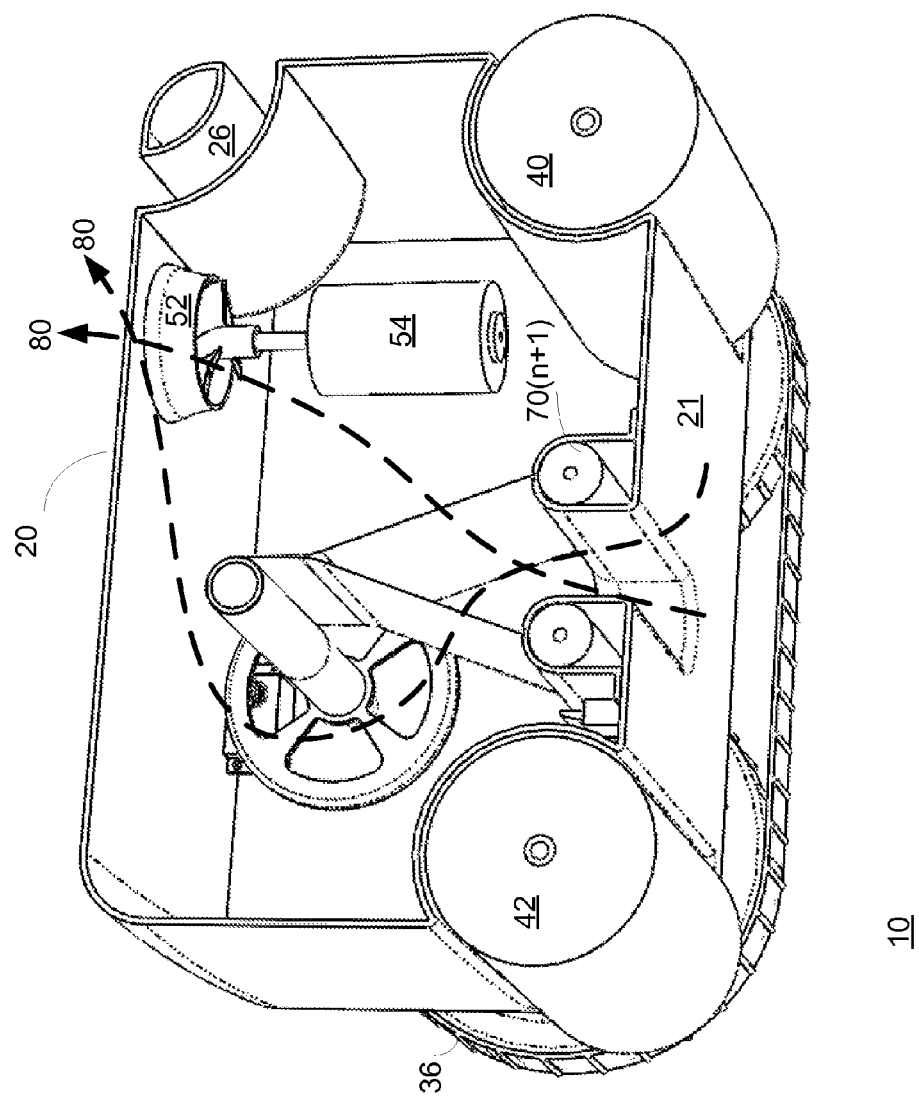
FIG. 4 is a cross sectional view of a pool cleaning robot taken along a longitudinal axis of the pool cleaning robot that illustrates a flow of fluid through the pool cleaning robot according to an embodiment of the invention.
Figure 5:
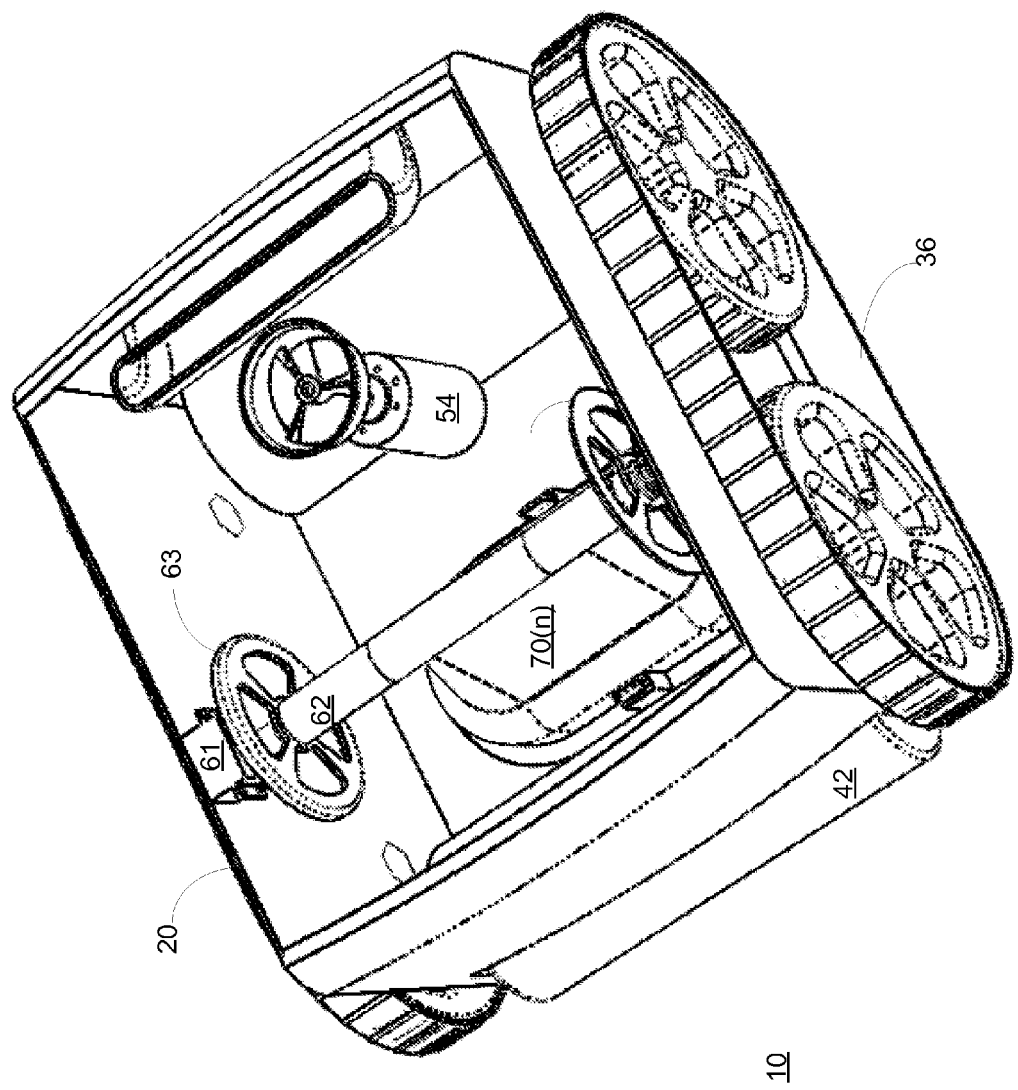
FIG. 5 is a top view of a pool cleaning robot without a top portion of its housing according to an embodiment of the invention.
Figure 7:
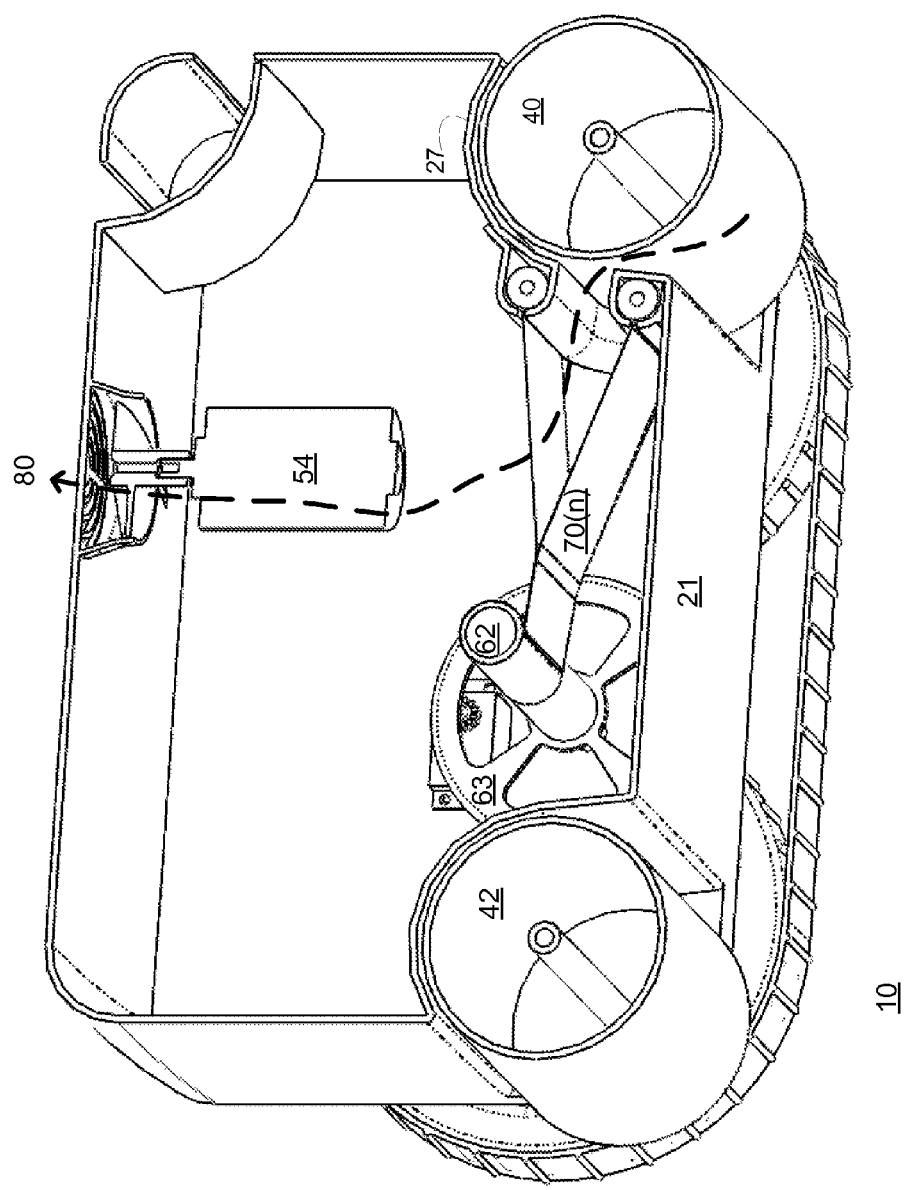
FIG. 7 is a cross sectional view of a pool cleaning robot taken along a longitudinal axis of the pool cleaning robot that illustrates a flow of fluid through the pool cleaning robot according to an embodiment of the invention.

The winding mechanism (denoted 60 in FIG. 2) may be configured to perform a winding of the filter thereby removing a filter portion (for example 70(n−1)) that was positioned in a filtering position and placing another filter portion (for example 70(n)) in the filtering position. Any filter portion, when positioned in the filtering position, may be configured to filter fluid that enters through the fluid inlet. FIGS. 4 and 7 (see arrows 80) illustrate the flow of fluid through the pool cleaning robot 10—wherein the fluid flows through fluid portion 70(n) that is positioned at the filtering position.

Figure 14:
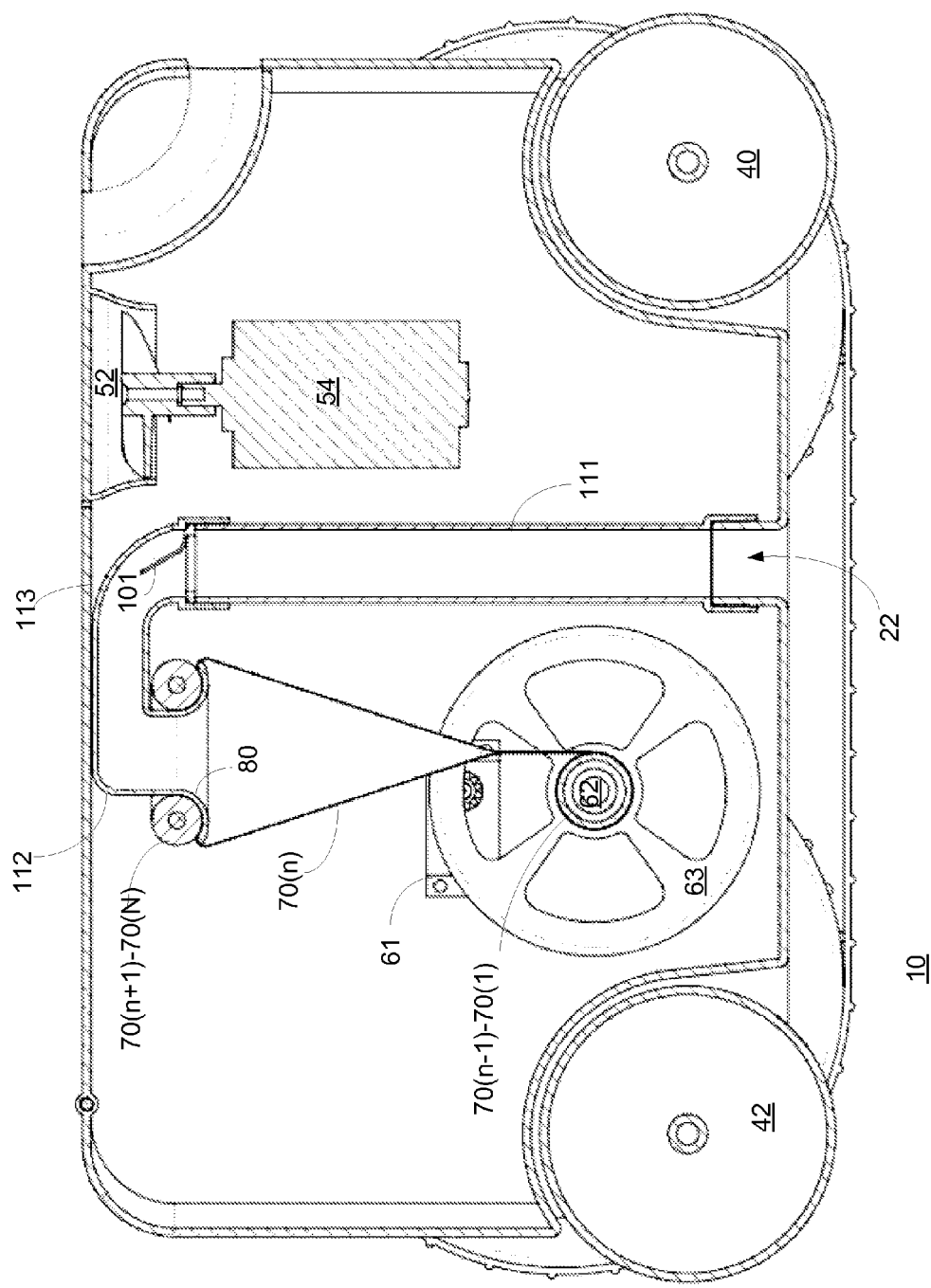
FIG. 14 illustrates a portion of a pool cleaning robot according to an embodiment of the invention.

FIG. 14 illustrates a pool cleaning robot 10 in which the holding mechanism 80 is located above the winding mechanism 60. Fluid passes through fluid inlet 22 and through an intermediate fluid path (illustrated in FIG. 14 as including a vertical pipe 111, first and second curved fluid control elements 112 and 113 that cause the fluid to flow through an inverted U shaped path into filter element 70(n). The unused filter portions (such as 70(n+1)-70(N)) are held by the holding mechanism 80 that is positioned directly above filter portion 70(n) and the winding mechanism (illustrated as including winding motor 61, first winding wheel 63 and filter axle 62. It is noted that the intermediate fluid path may have other shapes and orientations—for example—the intermediate fluid path may start by an oriented and/or non-linear portion, the holding mechanism may be offset in relation to (not positioned directly above) the winding mechanism, the filter portion 70(n) may be oriented by an angle that differs from ninety degrees from the bottom of the housing of the pool cleaning robot.

FIG. 14 illustrates a non-return valve 101 that is located at an upper end of pipe 111. It may be located in any location between the fluid inlet and the upper part of filter portion 70(n). It may prevent debris residue from escaping back when the pool cleaner is taken out from the water.

Filter 70

The filter or at least filter portions that were not yet positioned in the filtering position) may be wound around a ring or any other structural element of the holding mechanism that facilitates a release (such as but not limited to a smooth or virtually resistance free release) of the new filter portion in response to the rolling of the winding mechanism. The release can be unsmooth or may require overcoming some resistance.

The filter may be wound on the holding mechanism in a compressed form or in an non-compressed form. A filter portion that is positioned in the filtering position may be stretched, subject to tension or be virtually tension free.

The fabric of the filter may be of any desired length and may, for example, reach lengths of tens of meters (and even more). The fabric of the filter may have pores of one or more sizes—such as 50 micron holes, 100 micron holes, 200 micron holes or any size of holes. The pore size may be selected in view of the pool condition.

According to an embodiment of the invention the filter may be shaped as a long sleeve or may have any other shape. The filter may have a closed tip on one end and the other end may be coiled in an oval, elliptical or a circular manner within the holding mechanism. The filter portions that are held by the holding mechanisms may roll out themselves or may roll around another element—such as a ring or rubber band.

The filter can be made of any flexible or non-flexible filtering material. For example—woven fiber mesh, non-woven mesh, polymer, textile, paper, or combinations. Filters can have different configurations—for example coarser filters at the beginning of a swimming season and finer filters as the swimming season progresses.

The filter may have different filter portions (segments) that may equal to each other and/or may differ from each other by their filtering properties—for example one filter portion may differ from the other by a size of their pores—the first coarse section with large pores is used to filter larger debris for the beginning of the season, and the rest, finer section, to filter cleaner pool water.

The filter may have different alternating coarse/fine portions.

Holding Mechanism

The opened end of the filter (within or without a holding mechanism) may be positioned at or after fluid inlet 22. The filter may be connected to the pool cleaning robot in various manners—attached to the holding mechanism, pressed towards one or more receptacles, and the like.

The holding mechanism may include an inner part 80(1) that may store unused filter portions (filter portions that were not used for filtering). The inner part 80(1) may be detachably connected on the one side to the housing 20 via fastener (denoted 80(4) in FIG. 2). A clip shaped fastener or any type of fastener may be used and on the other side, connected onto a similarly shaped outer part of the holding mechanism that may be integrated with sidewall 23 or with bottom of housing 21 whereas a spacing is created between the first and the outer part of the holding mechanism as seen in FIGS. 3,4,6,7 and 9.

Figure 6:
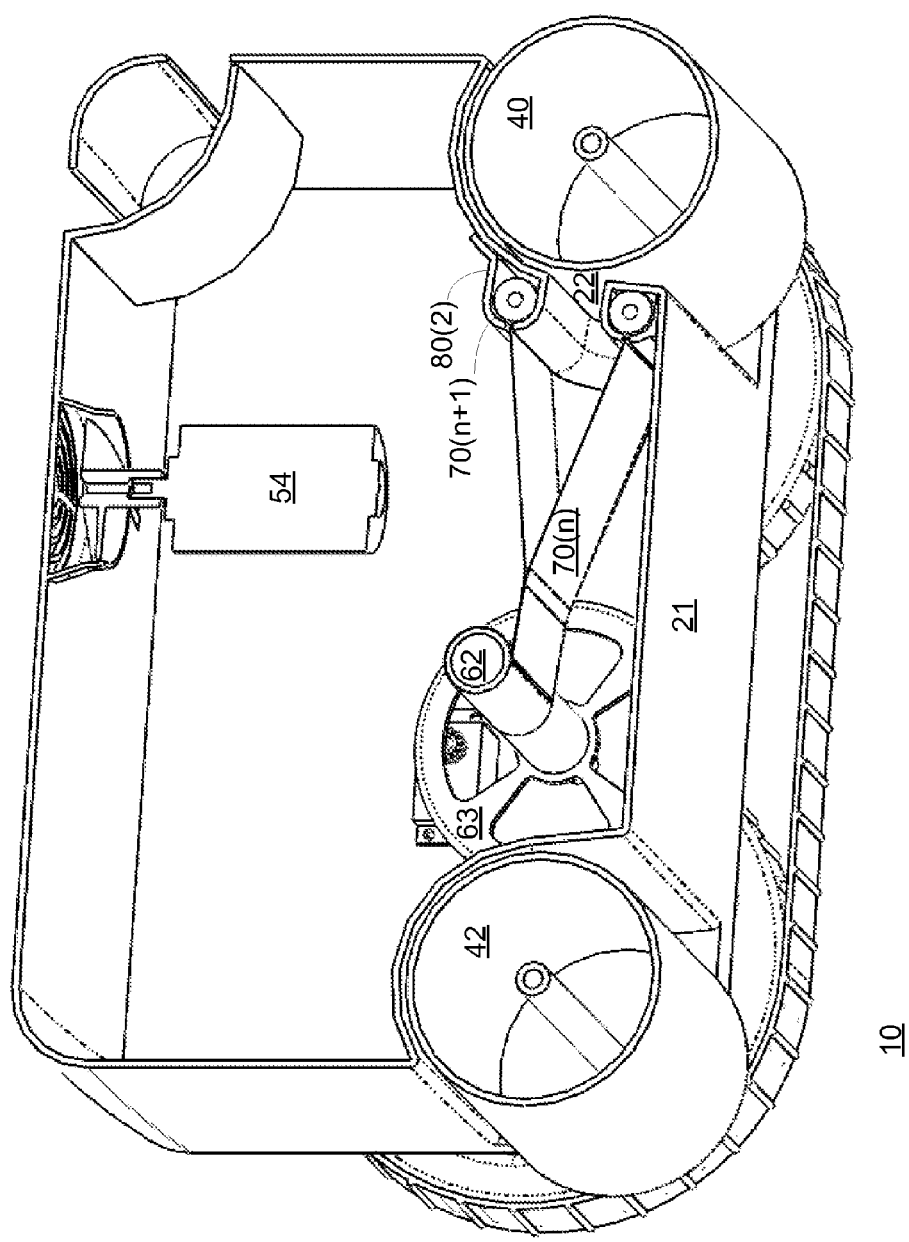
FIG. 6 is a cross sectional view of a pool cleaning robot taken along a longitudinal axis of the pool cleaning robot according to an embodiment of the invention.

FIGS. 3-5, 9 and 13 show that the filter 70 is positioned above the fluid inlet 22 that is formed in bottom 21 of housing 20 while FIGS. 6 and 7 illustrate a fluid inlet 22 that is located above bottom 21—below curved lower portion of housing 27 that is proximate to brushwheel 40. In this case a longitudinal axle of filter 70 (or of the filter portion 70(n)) is substantially horizontal and not vertical (as in FIGS. 3-5 and 9).

A non-return valve may be positioned within the aperture of inlet 22 such as valve 101 of FIG. 14 to prevent debris residue from escaping back when the pool cleaner is taken out from the water. A non-return valve may be included in any of the pool cleaning robots illustrated in any of the figures.

Winding Mechanism

Figure 8:
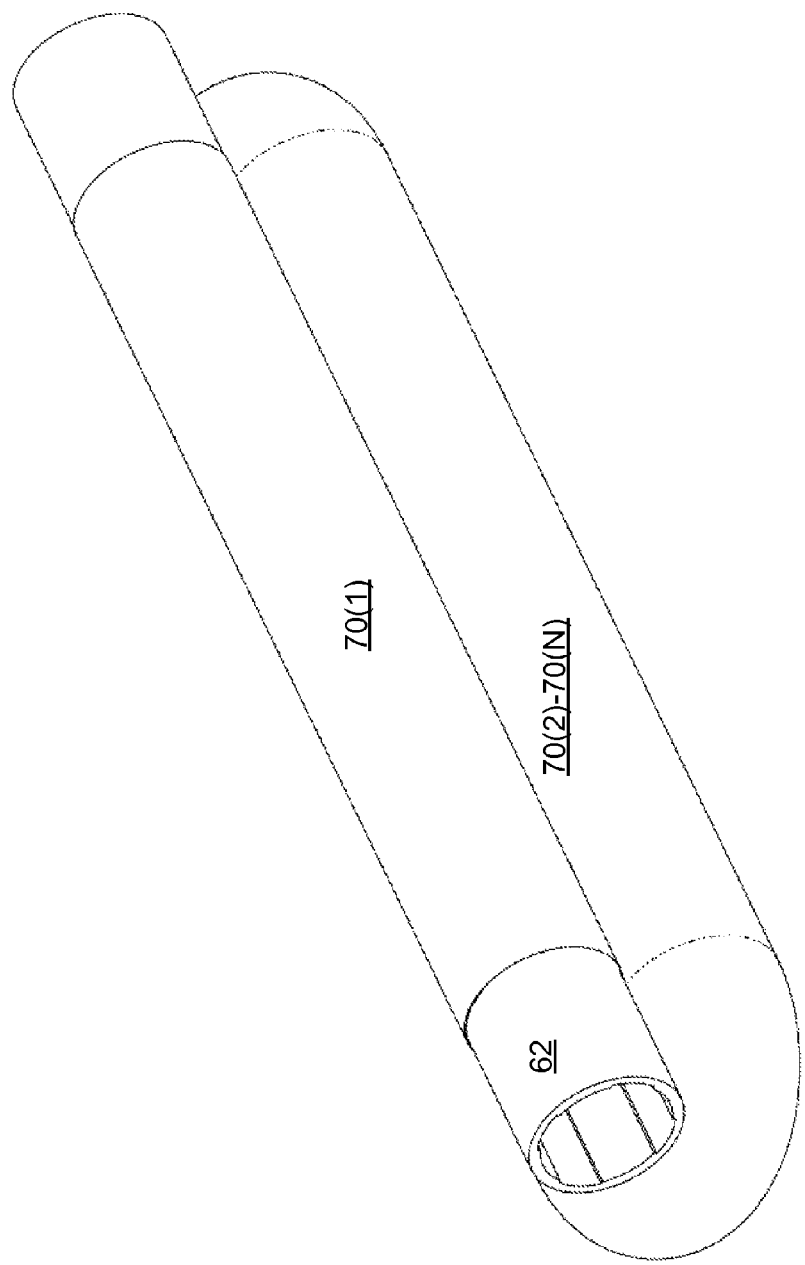
FIG. 8 illustrates a kit according to an embodiment of the invention.

FIG. 2 illustrates a filter that is partially wound over a filter axle 62. The filter axle 62 and the filter 70 may be provided as a kit (see, for example FIG. 8) in which a first loop portion 70(1) of the filter is wound over the filter axle 62 that may be sufficiently rough to prevent rotational slippage of the filter whilst the winding mechanism 60 rotates.

Figure 3:
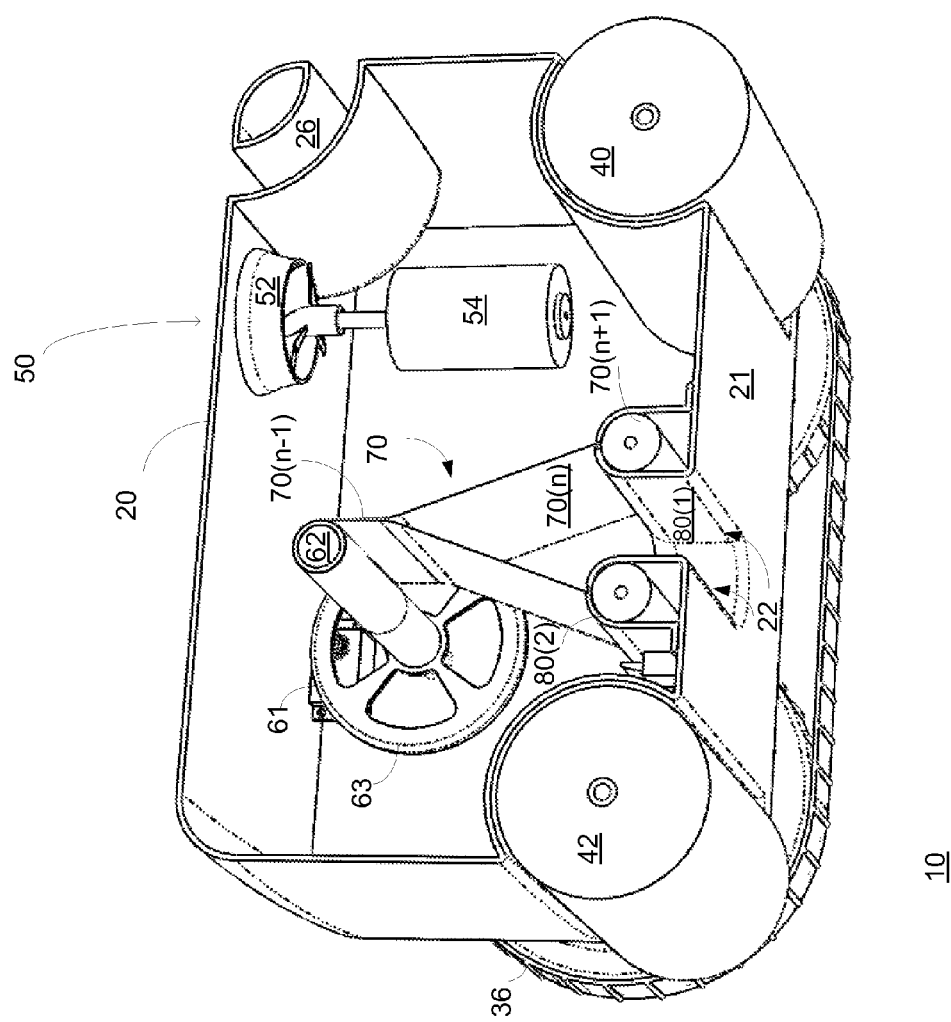
FIG. 3 is a cross sectional view of a pool cleaning robot taken along a longitudinal axis of the pool cleaning robot according to an embodiment of the invention.

The holding mechanism 80 can be a part of the filter, can be detachably coupled to the housing, may be partly detachable to the housing or may be integrated with the housing 20—see, for example, FIG. 3.

The filter can be provided while being rolled or otherwise connected to the holding mechanism. For example, the holding mechanism may include a compartment in which the filter is located. The filter can extend outside of the compartment and the winding process may extract the filter portion—consecutively or continuously unwinding and retracting one filter portion after the other.

Referring back to FIG. 2—the winding mechanism 60 is illustrated as including a filter axle 62, winding motor 61, first winding wheel 63, second winding wheel 64 and an detachable interface such as spring 65 for allowing an easy detachment of the filter axle 62 and maybe first and second winding wheels from the pool cleaning robot.

The closed end of the filter 70 (as well as filter portions 70(1)-70(n−1)) is wound around filter axle 62 that may be rotated by a rotation of first winding wheel 63 that is rotated by winding motor 61. The first winding wheel 63 may be mechanically coupled to the winding motor 61—either directly or via a transmission system (not shown).

Figure 12:
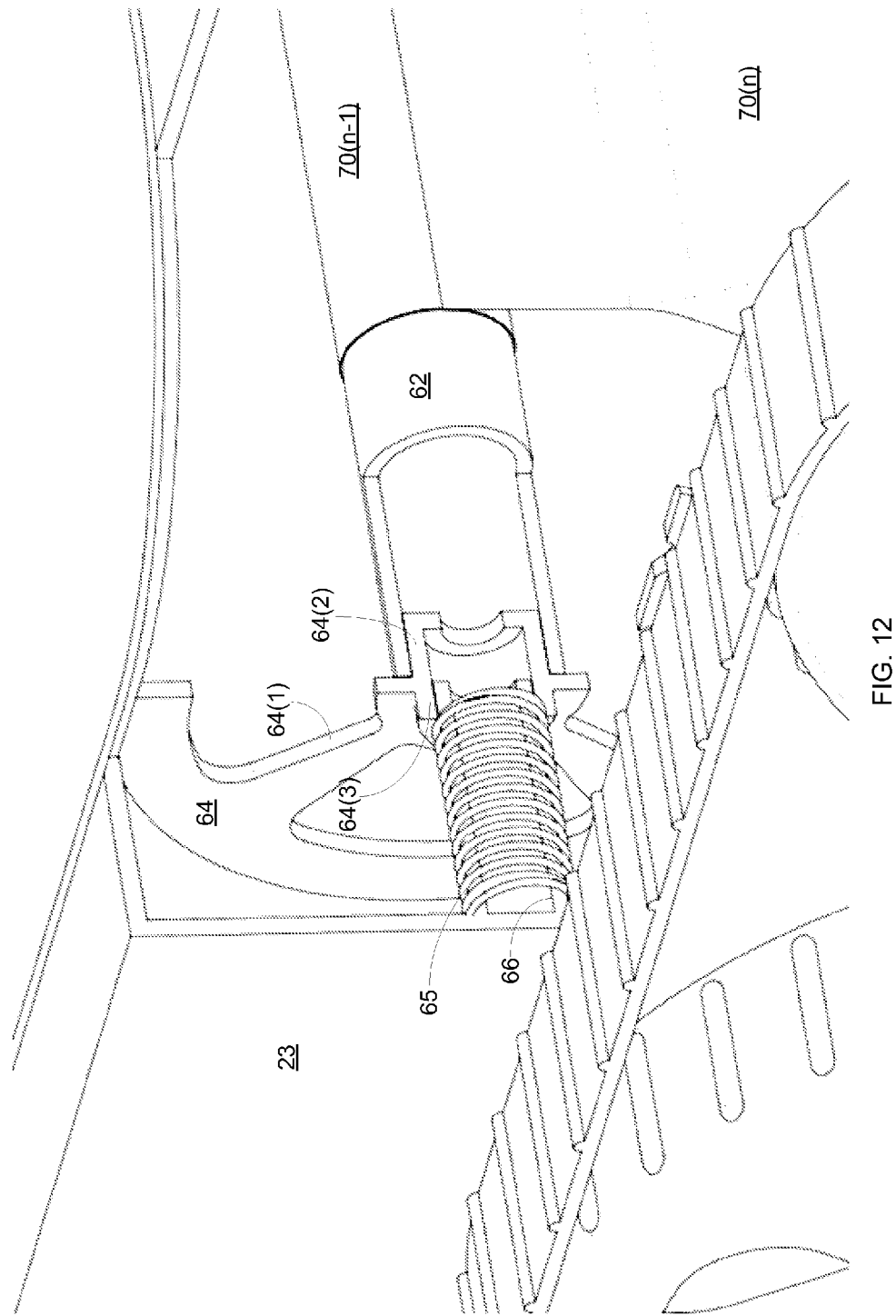
FIG. 12 illustrates a portion of a pool cleaning robot according to an embodiment of the invention.
Figure 13:
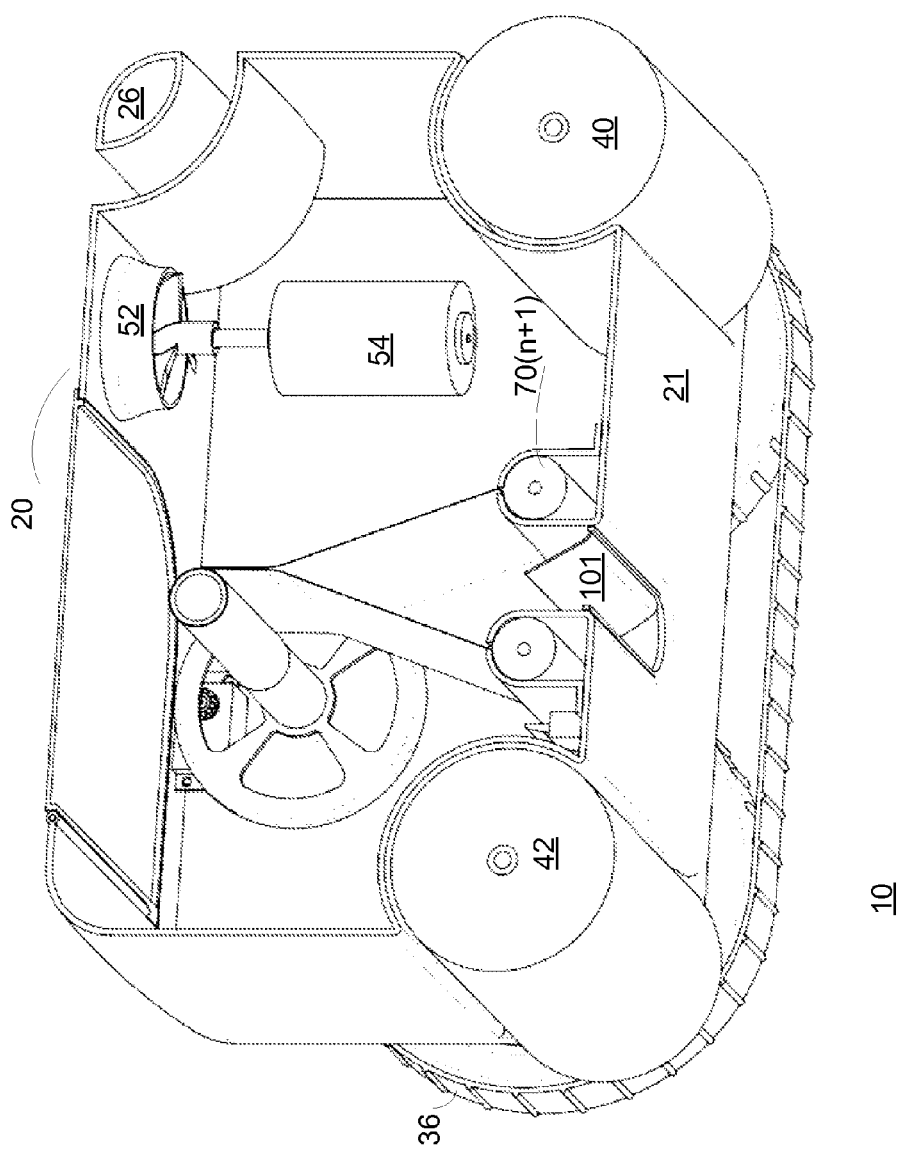
FIG. 13 illustrates a portion of a pool cleaning robot according to an embodiment of the invention.

FIG. 12 illustrates that the second winding wheel 64 may include an apertured disk 64(1) that is normal to the filter axle 62 and is positioned between an external ring 64(3) and an internal ring 64(2), wherein filter axle 62 and both rings 64(3) and 64(3) are coaxial. A supporting element such as cylinder 66 extends from side wall 23. Spring 65 located on the cylinder 65 and may contact external ring 64(3). When there is a need to detach the filter and the filter axle 62 the second winding wheel 64 is moved towards sidewall 23 until the inner ring 64(2) exits the filter axle 62. After the filter axle 62 is coupled to the pool cleaning robot the spring 65 pushes the first winding wheel 64 away from the wall and maintain the inner ring 64(2) within the filter axle 62. Each one of inner and external wheels 64(2) and 64(3) may belong to second winding wheel or be coupled to it.

It is noted that the same detachable arrangement can also be provided to the first winding wheel 63.

The rotation of the filter axle 62 along a first direction (for example clockwise or counterclockwise) causes a replacement of the filter portion that is positioned in the filtering position.

The filter axle 62 is connected between first and second winding wheels 63 and 64 and second winding wheel 64 is detachably connected (via detachable interface 65) to sidewall 23 of housing 20.

The detachable interface 65 may be a spring allowing pushing the second winding wheel 24 towards sidewall 23 when inserting the filter axle and the filter and also allowing pushing the second winding wheel 64 towards the sidewall 23 when removing or installing the filter axle and the filter.

It is noted that any other detachable interface known in the art may be used. It if further noted that the filter axle 62 itself may be connected to the first and/or second winding wheels via one or more detachable interfaces for allowing a detachment of the filter axle 62 from the first and/or second winding wheels.

The rotation of the filter axle 62 may, in addition to the winding of a used filter portion, compress debris collected by that filter portion. The rotation may assist in compressing debris of filter portions already wound around the filter axle 62.

The winding motor 61 can be dedicated to the rolling mechanism; it can be fed by electricity and/or by hydraulic suction/pressure and turbine/generator. The winding motor can be replaced by a gear or any other transmission mechanism that may mechanically couple the filter axle 62 to another motor of the pool cleaning robot (such as a pump motor 54 or a drive motor (not shown) of driving mechanism 50).

Figure 9:
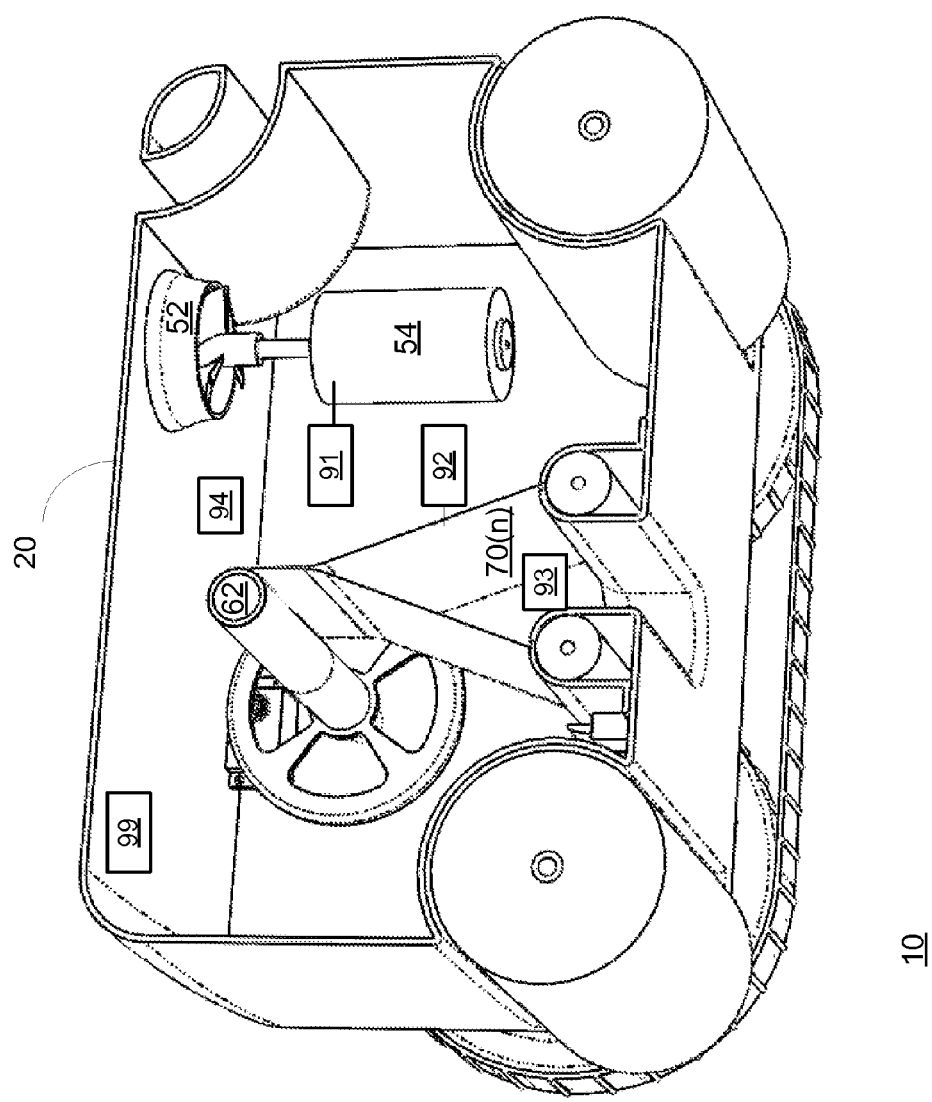
FIG. 9 is a cross sectional view of a pool cleaning robot taken along a longitudinal axis of the pool cleaning robot according to an embodiment of the invention.

The pool cleaning robot may have a sensor (such as sensors 91, 92, 93 and 94) for sensing when the filter portion should be replaced (is full and/or clogged). It may be a pressure sensor (pressure exceeds as the filter gets full and/or clogged) such as pressure sensor 93, a load sensor 91 for sensing the load on the pump motor 54 (load increases as the filter gets clogged), or a mechanical or optical sensor (sensor 94) for sensing changes in the shape of the filter (filter gets inflated as it gets clogged). FIG. 9 illustrates pressure sensor 93 as sensing the pressure of fluid or accumulated dirt/debris within a space surrounded by filter 70 but may be positioned in other positions within the pool cleaning robot, load sensor 91 may be electrically coupled to pump motor 54 or to a control board (not shown) that may provide pump motor indications such as an indication about the power consumption of pump motor. Sensor 92 senses the tension of the filter portion that is in the filtering position. Sensor 94 may track after the shape of filter 70.

FIG. 9 illustrates various options for placing sensors according to various embodiments of the invention. Each sensor may be coupled to controller 99 that may control the operations of pool cleaning robot or may at least control the winding and/or filter replacement operations.

One of these sensors (or yet another sensor) may sense when the entire filter should be replaced—sensing the radius, shape or volume of the wound filter portions that are held by the holding mechanism, sensing the radius, shape or volume of the wound filter portions that are wounded on the filter axle, load sensor for sensing a tension in the filter when the rolling mechanism tries to roll the filter but there is no spare filter portion wounded on the holding mechanism, load sensor for sensing the load on the rolling mechanism—the load is expected to increase when final filter portion is attempted to be rolled over. A rolling monitor (mechanical, optical, electronic) for estimating the rolling operations since the filter was attached to the pool cleaning robot.

The rolling process may be triggered by sensing various conditions, by a timer, in a predetermined manner and/or by any other manner. The rolling process may be continuous, non-continuous (pulsed) and the like.

Filter Replacement

The removing and positioning of the filter portions may be executed without external intervention and/or without opening the pool cleaning robot.

The removing and positioning can be executed multiple times (for example more than 10, 20, 30, 40, 50, 60, 70, 80, 90, 100 and more) thus dramatically increasing the periods between human interventions in filter replacement operations.

During filter installation the user may, for example, grab an edge of the filter edge, pull it and then connect that edge to the winding mechanism. For example—the user may dress the edge of the filter to a dedicated location on the filter axle (that is part of winding mechanism).

The filter axle may be a replaceable (one-time, disposable) element or a reusable axle. The holding mechanism 80 (for example an annular, circular, elliptical, oval or bagel shaped holding mechanism) may include an inner part 80(1) and an outer part 80(2).

Wherein the inner part 80(1) is closer to the fluid inlet 22 than the outer part 80(2). The inner and outer parts 80(1) and 80(2) are spaced apart from each other to define a slot or opening 80(3) through which the filter may pass. Each one of the inner and outer parts may be integrated with the housing or me be detachably coupled to another part of the pool cleaning robot (such as the housing).

When, for example, a part is detachably connected to another part of the housing it may use a fastener 80(4) for fastening it to the housing.

Figure 10:
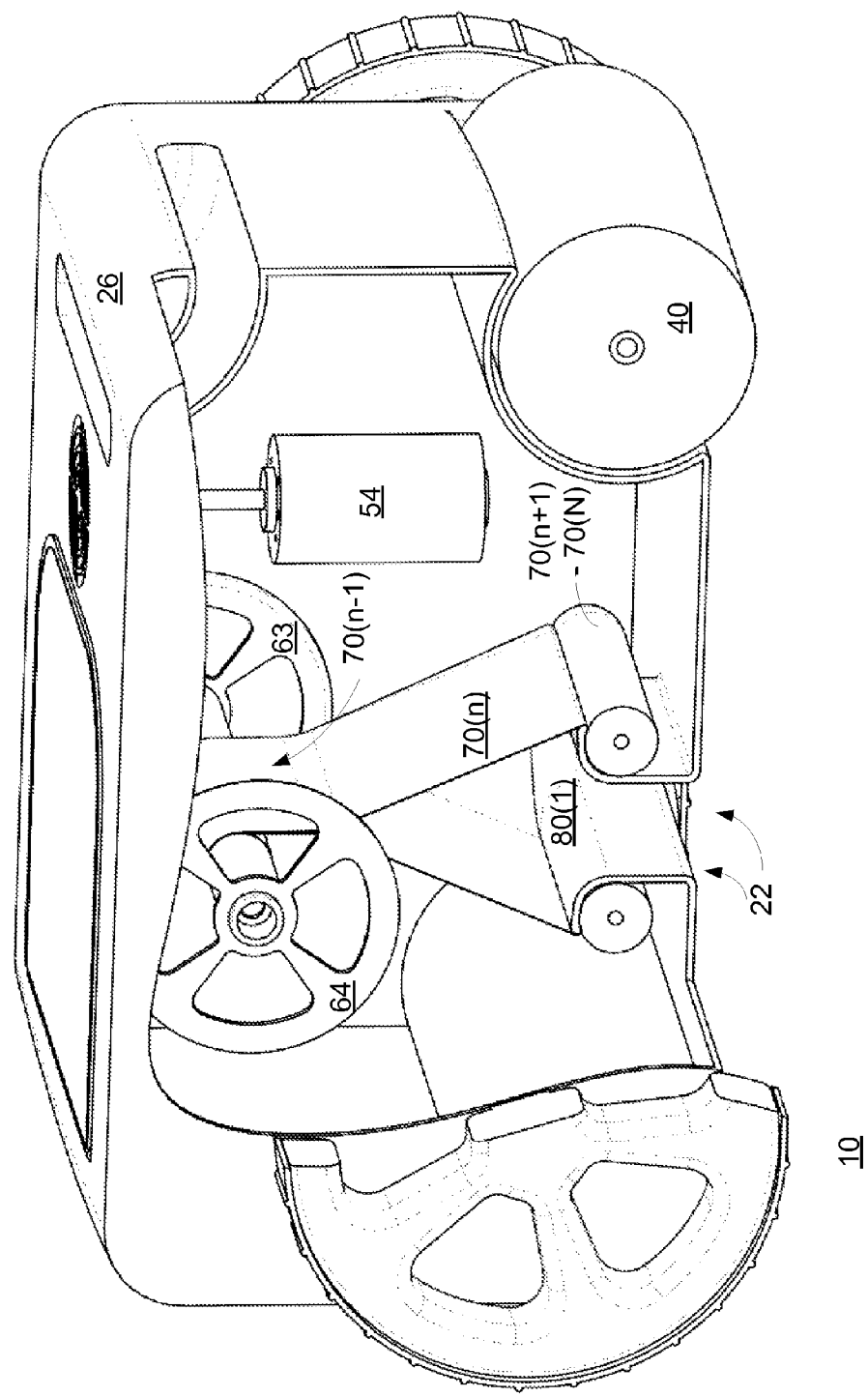
FIG. 10 illustrates a pool cleaning robot according to an embodiment of the invention.
Figure 11:
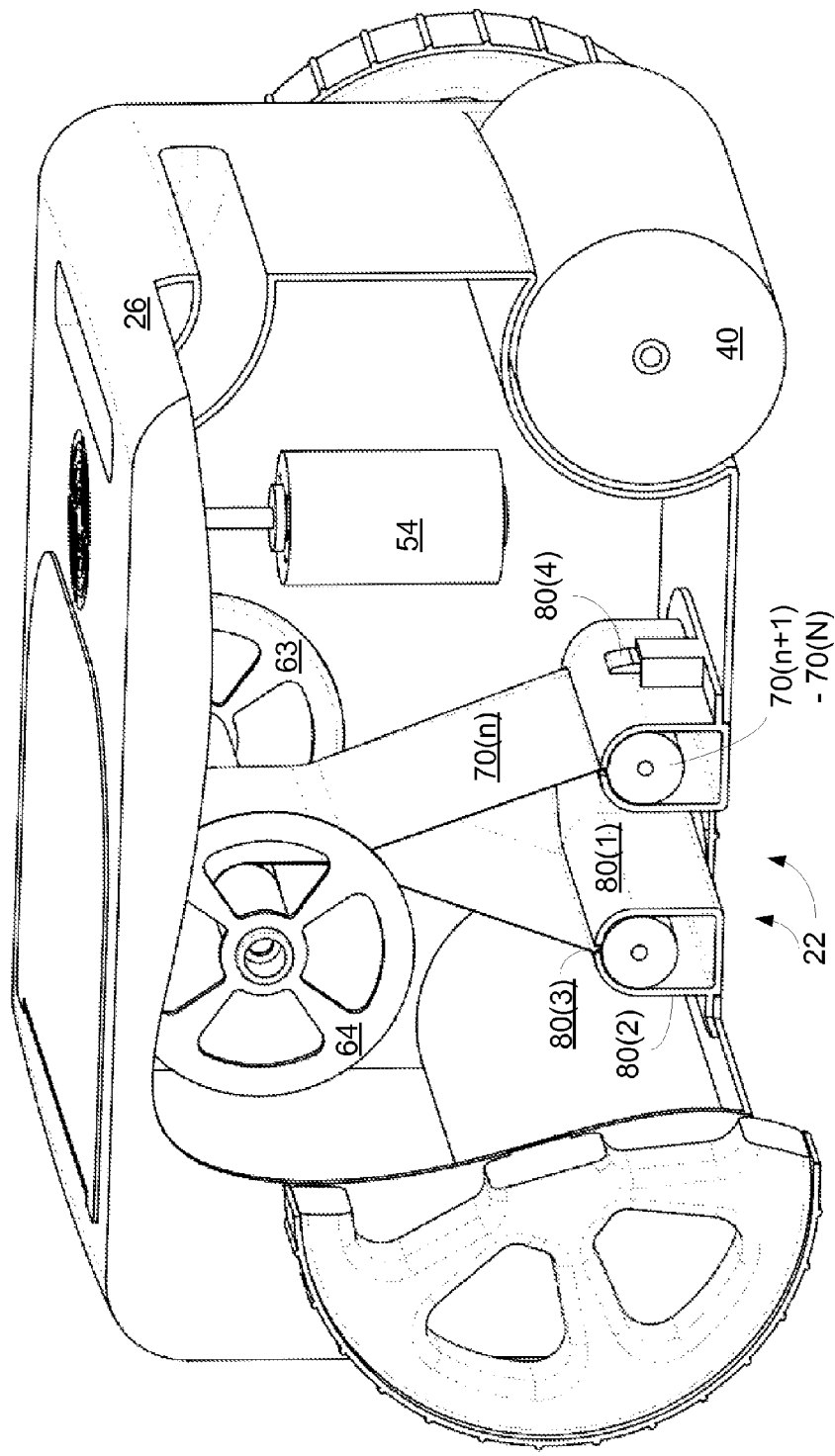
FIG. 11 illustrates a pool cleaning robot according to an embodiment of the invention.

FIGS. 2 and 11 illustrates fastener 80(4). FIGS. 2, 3, 6 and 11 illustrate outer part 80(2). FIGS. 3, 10 and 11 illustrate inner part 80(1). FIG. 11 illustrates opening 80(3). In FIG. 11 the holding mechanism 80 is detachably coupled to the housing. In FIG. 10 the holding mechanism 80 include inner part 80(1) but does not include outer part 80(2).

Each one of inner and outer parts 80(1) and 80(2) may be reusable or not reusable.

The filter can be inserted to the pool cleaning robot in various manners: through a removable top lid or through the bottom of housing 21. For example: the filter may be manually inserted through an opening formed at the opened end of the filter that is positioned after a water inlet of the pool cleaning robot, while the filter is extended towards the removable filter axle 62, connecting the closed end by inserting the filter (a first loop portion 70(1)) to the filter axle or the rolling mechanism axle (this may include pressing the spring to create the lateral space to allow the filter axle to be inserted and be connected between the wheels.

FIG. 10 illustrates a pool cleaning robot in which the holding mechanism has an inner part 80(1) that does not surround the unused filter portions (such as 70(n+1)-70(N)) but rather interfaces the unused filter portions from the side of the fluid inlet 22. FIG. 10 illustrates a inner part 80(1) that surrounds the fluid inlet 22 and has a curved upper end that extends outwards from the fluid inlet 22. Other shapes and arrangements may be provided.

FIG. 10 illustrates the inner part 80(1) as being a part of the housing of the pool cleaning robot. It is noted that the inner part of the holding mechanism may be detachably coupled to the housing (see, for example, FIG. 11).

According to an embodiments of the invention the pool cleaning robot may include multiple filters. The multiple filters may include two or more filters. Filters may differ from each other by at least one of the following properties: filtering level, shape, size, orientation (for example a pool cleaning robot may include a vertical filter such as in FIG. 3 and a horizontal filter such as in FIG. 6), and the like. Alternatively, filters may share at least one of the following properties: filtering level, shape, size, orientation, and the like.

Figure 15:
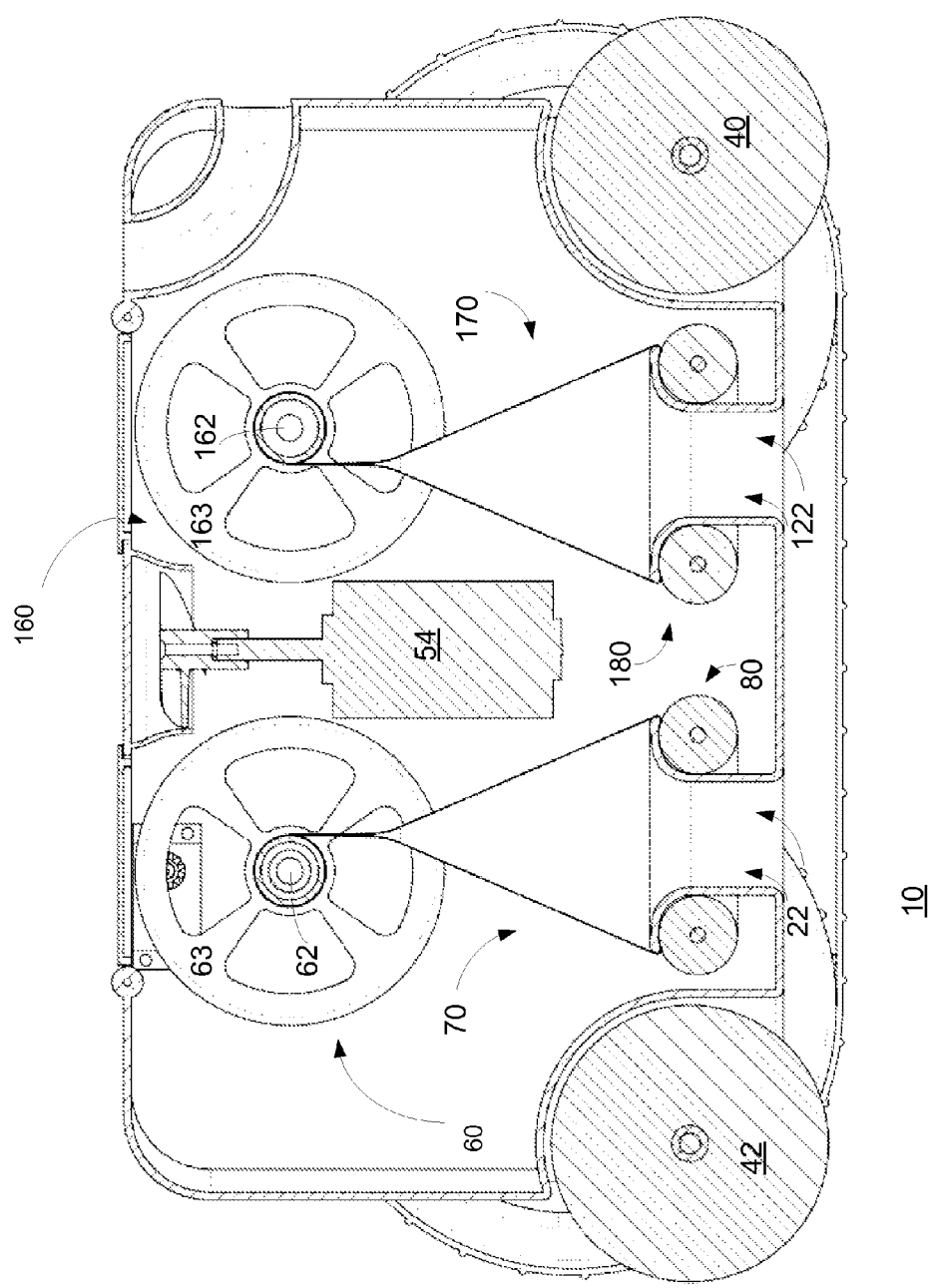
FIG. 15 illustrates a portion of a pool cleaning robot according to an embodiment of the invention.

Each filter may have its own holding mechanism and own winding mechanism and may be positioned over a dedicated fluid inlet. FIG. 15 illustrates a pool cleaning robot in 10 that includes two filters—filter 70 and additional filter 170, each has its own winding mechanism (winding mechanism 60 and additional winding mechanism 160 respectively), its own holding mechanism (holding mechanism 80 and additional holding mechanism 180) and its own fluid inlet (fluid inlet 22 and additional fluid inlet 122 respectively). In this figure both filters have the same shape, size and orientation (vertical). FIG. 15 illustrates a single motor 61—it is noted that additional winding mechanism 160 may have its own motor (not shown). Alternatively—a single motor may be used for rotating both filter axels—filter axel 62 and additional filter axel 162.

Alternatively, at least two filters may share at least one out of their holding mechanism and their winding mechanism. FIG. 16 illustrates a pool cleaning robot 10 that includes a single fluid inlet 22, a first filter 70 that is held by holding mechanism 80 and winded by winding mechanism 60, additional filter 170 that is held by holding mechanism 180 and winded by winding mechanism 60. In this figure both filters share the same winding mechanism 60 and additional filter 170 surrounds filter 70. Filter 70 may be a coarser filter than filter additional 170—but this is not necessarily so.

According to yet another embodiment of the invention the pool cleaning robot may include a first number (N1) of filters, a second number (N2) of holding mechanisms, a third number (N3) of winding mechanisms and a fourth number (N4) of input inlets. N1, N2, N3 and N4 are positive integers (may be one or more). At least one out of N1, N2, N3 and N4 may differ from each other. Alternatively, N1, N2, N3 and N4 may be equal to each other. One or more filters may share one or more winding mechanisms and/or one or more holding mechanisms. One or more other filters may share one or more winding mechanisms and/or one or more holding mechanisms.

N1 usually may not be smaller than N2 and N3 but this is not necessarily so. A filter may filter fluid that passes through one or more fluid inlets. One or more fluid inlets may feed one or more filters.

For example—a pool cleaning robot may include multiple combinations (for example—2, 3 and even more) of filters, holding mechanisms and winding mechanism. Each combination may include two filters, two holding mechanisms and a single winding mechanism (a single combination is illustrated in FIG. 16). The multiple combinations may be spaced apart from each other, may be parallel to each other, oriented in relation to each other and the like. Two or more of the multiple combinations may differ from each other by size, shape, number of filters, filtering properties of filters, number of holding mechanisms, number of winding mechanisms, and the like. For example—one combination may include a single filter and another combination may include multiple filters. Alternatively, all combinations are the same. For example—each combination may include multiple filters, multiple holding mechanisms and a single winding mechanism.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A pool cleaning robot that comprises a fluid inlet, a pump motor, an impeller, a filter, a driving motor for moving the pool cleaning robot, a winding mechanism and a holding mechanism;
   wherein the holding mechanism is configured to hold the filter;
   wherein the winding mechanism is configured to perform a winding of the filter thereby removing a filter portion that was positioned in a filtering position and placing another filter portion in the filtering position;
   wherein the filter portion, when positioned in the filtering position, is configured to filter fluid that enters through the fluid inlet and is upstream to the pump motor.

2. The pool cleaning robot according to claim 1 wherein the winding mechanism is configured to perform the winding of the filter by performing multiple winding iterations; wherein each winding iteration results in a removal of one current filter portion from the filtering position and a placement of another filter portion in the filtering position; wherein each winding iteration is followed by a filtering period during which the other filter portion is arranged to filter fluid.

3. The pool cleaning robot according to claim 2 wherein each winding iteration comprises a continuous winding of the filter.

4. The pool cleaning robot according to claim 2 wherein each winding iteration comprises a non-continuous winding of the filter.

5. The pool cleaning robot according to claim 1 wherein the winding of the filter extracts the other filter portion from the holding mechanism.

6. The pool cleaning robot according to claim 1 wherein the filter comprises multiple filter portions; wherein at least two of the multiple filter portions differ from each other by at least one filtering parameter.

7. The pool cleaning robot according to claim 1 wherein the other filter portion, when positioned in the filtering position, has an opening that faces the fluid inlet and has a closed end that faces the winding mechanism.

8. The pool cleaning robot according to claim 1 wherein at least a portion of the winding mechanism is detachably coupled to a housing of the pool cleaning robot.

9. The pool cleaning robot according to claim 1 comprising a controller; wherein the controller is configured to trigger the winding of the filter.

10. The pool cleaning robot according to claim 1 comprising a sensor that is configured to provide at least one of a filter replacement indication and a filter portion replacement indication.

11. The pool cleaning robot according to claim 10 wherein the sensor is a fluid attribute sensor.

12. The pool cleaning robot according to claim 10 wherein the sensor is a filter shape sensor.

13. The pool cleaning robot according to claim 10 wherein the sensor is a wound filter sensor that is configured to sense attributes of filter portions that are wound by the winding mechanism.

14. The pool cleaning robot according to claim 10 wherein the sensor is a load sensor that is configured to sense a tension of the filter.

15. The pool cleaning robot according to claim 10 wherein the sensor is a winding monitor that is configured to estimate a progress of the winding of the filter.

16. The pool cleaning robot according to claim 1 wherein the winding mechanism comprises a winding motor that is dedicated for winding the filter.

17. The pool cleaning robot according to claim 1 wherein the winding mechanism meshes with a transmission mechanism that mechanically couples an axle on which the filter is wound to a motor selected out of the pump motor and the drive motor.

18. The pool cleaning robot according to claim 1 wherein the winding mechanism is configured to compress debris trapped within the filter by performing the winding of the filter.

19. The pool cleaning robot according to claim 1 wherein the holding mechanism is configured to store multiple filter portions, before any of the multiple filter portions are positioned in the filtering position, in a compressed form.

20. The pool cleaning robot according to claim 1 wherein the holding mechanism surrounds a fluid path that starts at the fluid inlet.

21. The pool cleaning robot according to claim 1 wherein the holding mechanism is detachably coupled to a housing of the pool cleaning robot.

22. The pool cleaning robot according to claim 1 wherein the filter is made of an elastic fabric.

23. The pool cleaning robot according to claim 1 wherein the filter is made of a non-elastic fabric.

24. The pool cleaning robot according to claim 1 further comprising an additional filter, an additional winding mechanism, an additional fluid inlet and an additional holding mechanism; wherein the additional holding mechanism is configured to hold the additional filter; wherein the additional winding mechanism is configured to perform a winding of the additional filter thereby removing an additional filter portion that was positioned in an additional filter filtering position and placing another additional filter portion in the additional filter filtering position; wherein the additional filter portion, when positioned in the additional filter filtering position, is configured to filter fluid that passes through the additional filter.

25. The pool cleaning robot according to claim 24 wherein the filter and the additional filter are spaced apart from each other.

26. The pool cleaning robot according to claim 24 wherein a length direction of the filter and a length direction of the additional filter are parallel to each other.

27. The pool cleaning robot according to claim 24 wherein a length direction of the filter is oriented to a length direction of the additional filter.

28. The pool cleaning robot according to claim 24 wherein the filter and the additional filter differ from each other by at least one filtering parameter.

29. The pool cleaning robot according to claim 1 further comprising an additional filter, wherein winding mechanism is further configured to perform a winding of the additional filter thereby removing an additional filter portion that was positioned in an additional filtering position and placing another additional filter portion in the additional filtering position; wherein the additional filter portion, when positioned in the additional filter filtering position, is configured to filter fluid that enters through the fluid inlet.

30. The pool cleaning robot according to claim 29 wherein the additional filter surrounds the filter.

31. The pool cleaning robot according to claim 29 wherein the filter is of a finer filtering level than the additional filter.

32. The pool cleaning robot according to claim 1 further comprising an additional filter, wherein the winding mechanism is further configured to perform a winding of the additional filter thereby removing an additional filter portion that was positioned in an additional filtering position and placing another additional filter portion in the additional filtering position; wherein the additional filter portion, when positioned in the additional filtering position, is configured to filter fluid that enters through an additional fluid inlet.

33. The pool cleaning robot according to claim 29 wherein the additional filter surrounds the filter and wherein the filter is of a finer filtering level than the additional filter.

34. The pool cleaning robot according to claim 1 wherein the other filter portion, when positioned in the filtering position, contacts the filter portion and an unused filter portion, wherein the unused filter portion is held by the holding mechanism.

35. The pool cleaning robot according to claim 1 wherein a longitudinal axis of the filter is substantially horizontal.

36. The pool cleaning robot according to claim 1 wherein the pump motor is positioned above the holding mechanism and above the winding mechanism.

37. The pool cleaning robot according to claim 1 wherein the holding mechanism is positioned above the winding mechanism, wherein the pool cleaning robot comprises a fluid inlet that is positioned at a bottom of a housing of the pool cleaning robot, wherein the pool cleaning robot further comprises an intermediate fluid path that extends from the fluid inlet to above the holding mechanism.

38. A pool cleaning robot that comprises a fluid inlet, a pump motor, an impeller, a filter, a driving motor for moving the pool cleaning robot, a winding mechanism and a holding mechanism;
   wherein the filter comprises multiple filter portions;
   wherein the filter is coupled to the winding mechanism and to the holding mechanism;
   wherein the winding mechanism is configured to perform multiple winding iterations of the filter;
   wherein during each winding iteration a first filter portion is moved from a holding position to a filtering position and a second filter portion is moved from the filtering position to a wound position;
   wherein when positioned in the filtering position the first filter portion is upstream to the pump motor;
   wherein when positioned in the holding position the first filter portion contacts the holding mechanism;
   wherein during a filtering period that occurs when the first filter portion is positioned in the filtering position the first filter portion is configured to filter fluid that enters through a fluid inlet of the pool cleaning robot; wherein the first filter portion, when positioned in the filtering position, contacts the second filter portion and an unused filter portion, wherein the unused filter portion is held by the holding mechanism;
   wherein when positioned in the wound position the second filter portion contacts the winding mechanism.

39. The pool cleaning robot according to claim 38 wherein the pump motor is positioned above the holding mechanism and above the winding mechanism.

* * * * *